Patented July 14, 1931

1,814,720

UNITED STATES PATENT OFFICE

JOHN WESLEY MARDEN AND MALCOLM N. RICH, OF EAST ORANGE, NEW JERSEY, ASSIGNORS TO WESTINGHOUSE LAMP COMPANY, A CORPORATION OF PENNSYLVANIA

PREPARATION OF DUCTILE VANADIUM

No Drawing.   Application filed January 6, 1925.   Serial No. 796.

This invention relates to the preparation of the rare or refractory metals in coherent, ductile form and more particularly to the preparation of ductile vanadium.

Several attempts have been made by using different processes to prepare vanadium in the ductile condition. One of these methods consisted in reducing an oxygen-free vanadium chloride with hydrogen. Vanadium powder prepared by this process is very brittle, hard and crystalline, and entirely unsuitable for use in preparing ductile vanadium. The preparation of the oxygen-free chloride is attended with the greatest difficulty and since pure hydrogen is also difficult to obtain, the resultant powder is always contaminated with oxides of vanadium.

Another of these processes is that employed by Moissan and consisting in reducing the oxide by means of carbon. The vanadium thus obtained is not useful for the reason that it is contaminated with considerable carbon, as high as 4.4 to 5.3%.

Von Bolton claims to have produced vanadium by following the process for making tantalum, but our experience with this process indicates that vanadium which is ductile, cannot be made thereby. Vanadium differs from tantalum in that its oxide is not so readily dissociatable on heat treatment as the oxide of tantalum. On this account the process of Von Bolton is not suitable for its production. Further, it differs from tungsten or molybdenum in its properties toward hydrogen. Pure vanadium may be worked cold without any coverings if desired but if a piece of pure ductile vanadium is heated in hydrogen to a red heat, it immediately becomes extremely brittle and fragile and cannot again be worked either hot or cold. The methods for the preparation of ductile tungsten or molybdenum are not any more satisfactory for the preparation of vanadium than the processes of Von Bolton. All of these processes will produce impure vanadium but none except the process hereindescribed will yield pure ductile metal.

Other methods of preparing vanadium such as by electrolysis, reduction of the oxide by calcium carbide, etc., have been attempted but in no instance, so far as we have been able to learn, has ductile vanadium been obtained, or even vanadium which is in a pure coherent condition.

Theoretically, vanadium should be a relatively soft metal as shown by the atomic volume of the metal since the atomic volume is approximately inversely proportional to the hardness. Vanadium has been found to have a center cubic structure by X-ray crystal analysis and consequently it should be a metal capable of cold working.

In preparing ductile vanadium in accordance with the present invention, recourse was had to the method described in copending application Serial No. 618,544, Marden et al., filed February 12, 1923, and more fully set forth in copending application Serial No. 717,940, Marden et al., filed June 5, 1924, both of which are assigned to the same assignee as the present application.

According to the process described in the copending applications referred to and the present invention, the oxide of vanadium, $V_2O_5$ is carefully prepared so as to be in very pure condition, particularly free from iron, silica, uranium and the like. The pure oxide is reduced by mixing with calcium as the reducing agent and calcium chloride as a fluxing agent. The mixture or charge is placed in a bomb which is sealed from the atmosphere and the bomb is then heated to effect the reaction. Upon completion of the reaction, the undesirable products may be removed by treatment with water and acid and the vanadium thus extracted. The vanadium is obtained in the form of a very coarse powder, together with beads of sufficient size to work directly into desired forms.

The powder, although coarse, may contain hydrogen, which may be removed by fusing the powder in a vacuum. The fusing of the vanadium may be accomplished by pressing the powder into the form of a disk and then placing the same in a furnace such as described in Patent #1,480,301. The heat treatment to remove the hydrogen may follow the method described in copending application Serial No. 432,325, Marden et al., filed December 21, 1920, assigned to the same assignee as the present application. This part of the process of preparing the vanadium consists in slowly heating the metal to remove the occluded gases and then after substantially all of the gases have been removed to increase the temperature. The heating should be carried to such a temperature that fusion occurs, otherwise the hydrogen may not be entirely removed. The quantity of hydrogen present in the finished product may be indicated by the ductility of the metal. The more ductile it is the greater the freedom from hydrogen.

From the foregoing it will be observed that the process contemplates the reduction of a pure oxide of vanadium by means of calcium in the presence of calcium chloride, the recovery of the resulting powder, and its heat treatment to such a high temperature that substantially all of the hydrogen, which may be present, is removed, i. e., until fusion occurs. The metal thus obtained can then be worked into desired shapes.

Vanadium metal prepared by treatment of the powder in the high frequency furnace or from the beads resulting from the reduction of the oxide by calcium and calcium chloride, may be cold worked or else placed in a slug of Norway iron and cold worked, or else the slug may be heated and the working continued under such conditions. In case the vanadium is worked under iron, the latter may be removed by dissolving with hydrochloric acid, but not nitric or sulphuric acids, since vanadium is readily soluble in these last two acids.

The vanadium produced in accordance with the foregoing process has some properties in common with tantalum to which it has certain chemical relations, both elements belonging to the same periodic group. It has been found that vanadium produced by us by practicing the foregoing process has a high melting point, low atomic weight and does not volatilize or blacken a bulb even at its melting point. The property of low volatility makes the material suitable for many obvious uses. It is very useful for a backing for X-ray targets as set forth in the copending application Serial No. 461,051 filed Apr. 13, 1921, assigned to the same assignee as the present application.

Modifications of the foregoing process may suggest themselves to those skilled in the art, but such as come within the scope of the appended claims are contemplated by us as forming part of our invention.

What is claimed is:

1. The method of preparing vanadium which comprises reducing an oxide of vanadium by means of calcium in the presence of an alkaline earth halide capable of taking up calcium oxide formed during the reaction and which does not contaminate the vanadium.

2. The method of preparing vanadium which comprises reducing an oxide of vanadium by means of calcium in the presence of an alkaline earth halide capable of taking up calcium oxide formed during the reaction and which does not contaminate the vanadium, said reduction being effected in a closed bomb.

3. The preparation of vanadium comprising reducing vanadium oxide by means of calcium in the presence of calcium chloride.

4. The preparation of vanadium comprising reducing vanadium oxide by means of calcium in the presence of calcium chloride, said reduction being effected in a closed bomb.

5. The method of preparing vanadium which comprises reducing vanadium oxide free from silica, iron and other impurities, by means of calcium in the presence of an alkaline earth halide capable of taking up calcium oxide formed during the reaction and which does not contaminate the vanadium.

6. The method of preparing vanadium which comprises reducing vanadium oxide free from silica, iron and other impurities, by means of calcium in the presence of an alkaline earth halide capable of taking up calcium oxide formed during the reaction and which does not contaminate the vanadium, said reduction being carried out in a closed bomb.

7. The method of preparing vanadium which comprises reducing an oxide of vanadium by means of calcium in the presence of an alkaline earth halide capable of taking up calcium oxide formed during the reaction and which does not contaminate the vanadium, said reduction being effected away from the atmosphere.

8. The preparation of vanadium comprising reducing vanadium oxide by means of calcium in the presence of calcium chloride, said reduction being effected away from the atmosphere.

9. The method of preparing a shaped body of ductile vanadium which comprises reducing a pure oxide of vanadium by calcium in the presence of calcium chloride, recovering the vanadium, heat treating the powder in a vacuum until fused and working the metal to the desired form.

In testimony whereof, we have hereunto subscribed our names this 5th day of January, 1925.

JOHN WESLEY MARDEN.
MALCOLM N. RICH.